Feb. 27, 1962 J. TORRES 3,023,030
QUICK DISCONNECT COUPLING FOR FLUID LINES
Filed July 28, 1958 3 Sheets-Sheet 1
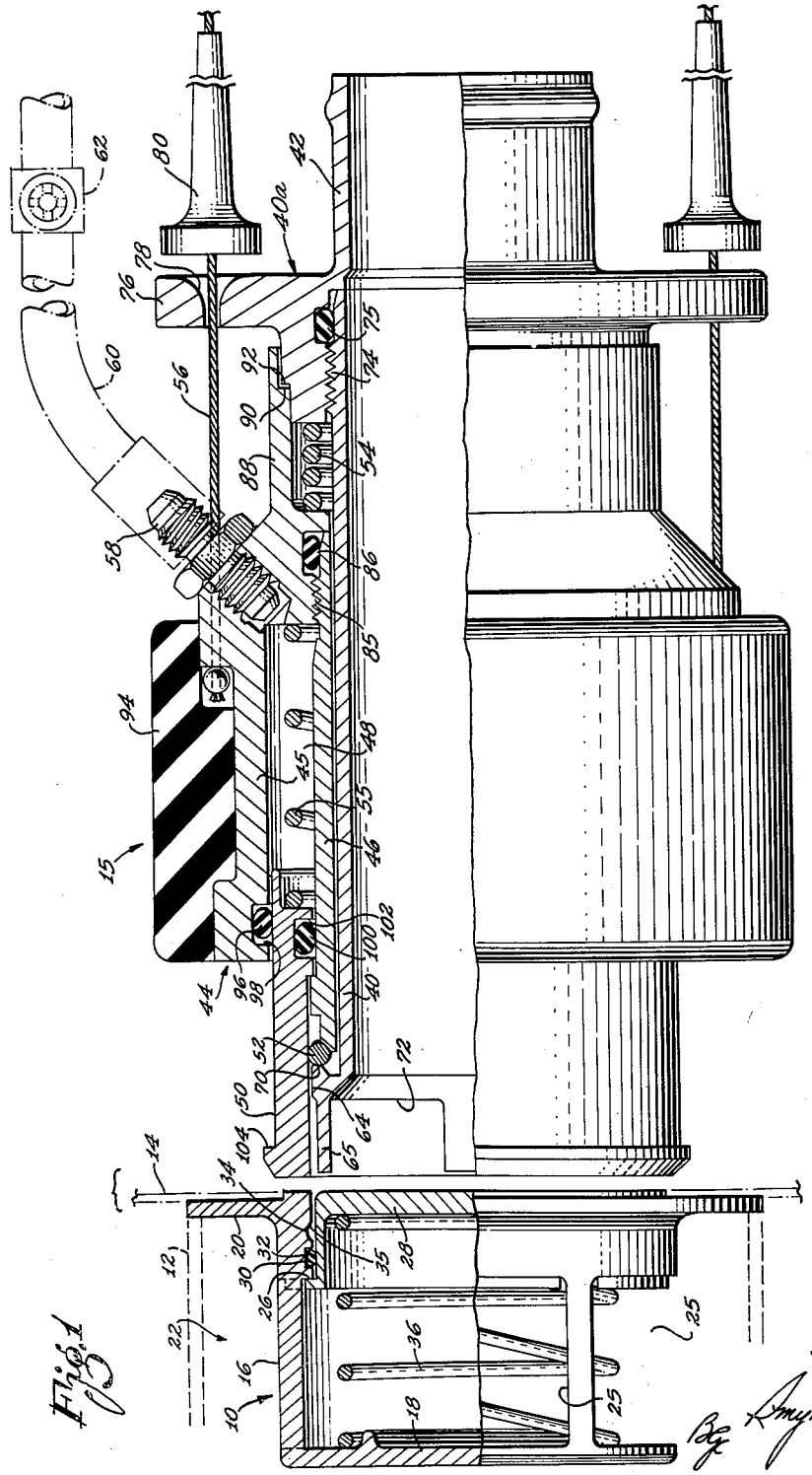
INVENTOR
Jorge Torres
Attorneys Feb. 27, 1962   J. TORRES   3,023,030
QUICK DISCONNECT COUPLING FOR FLUID LINES
Filed July 28, 1958   3 Sheets-Sheet 2
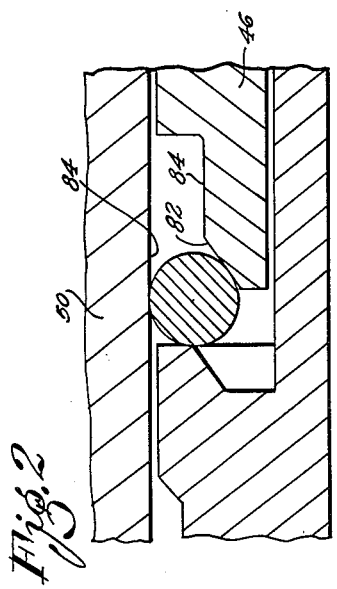
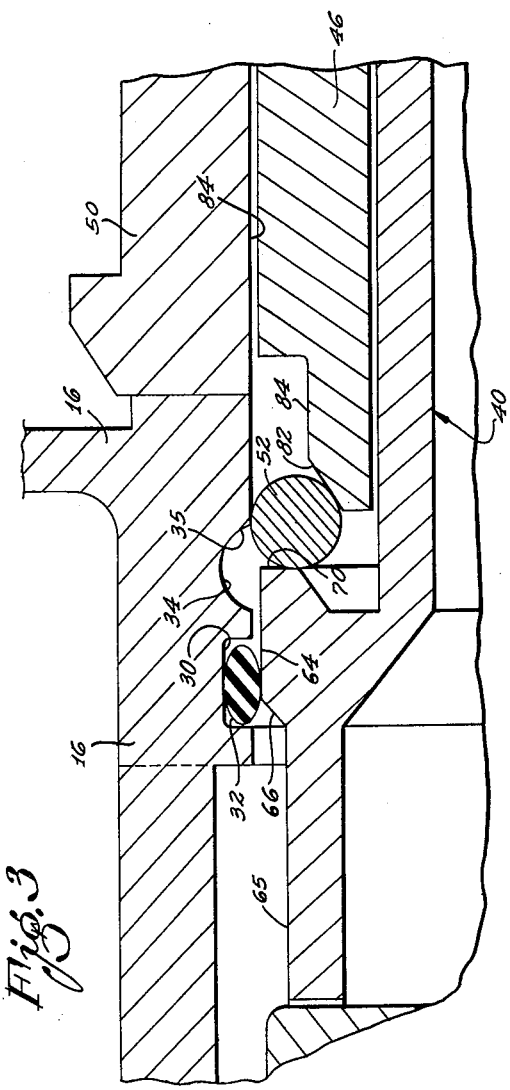
INVENTOR.
Jorge Torres
By
Attorneys

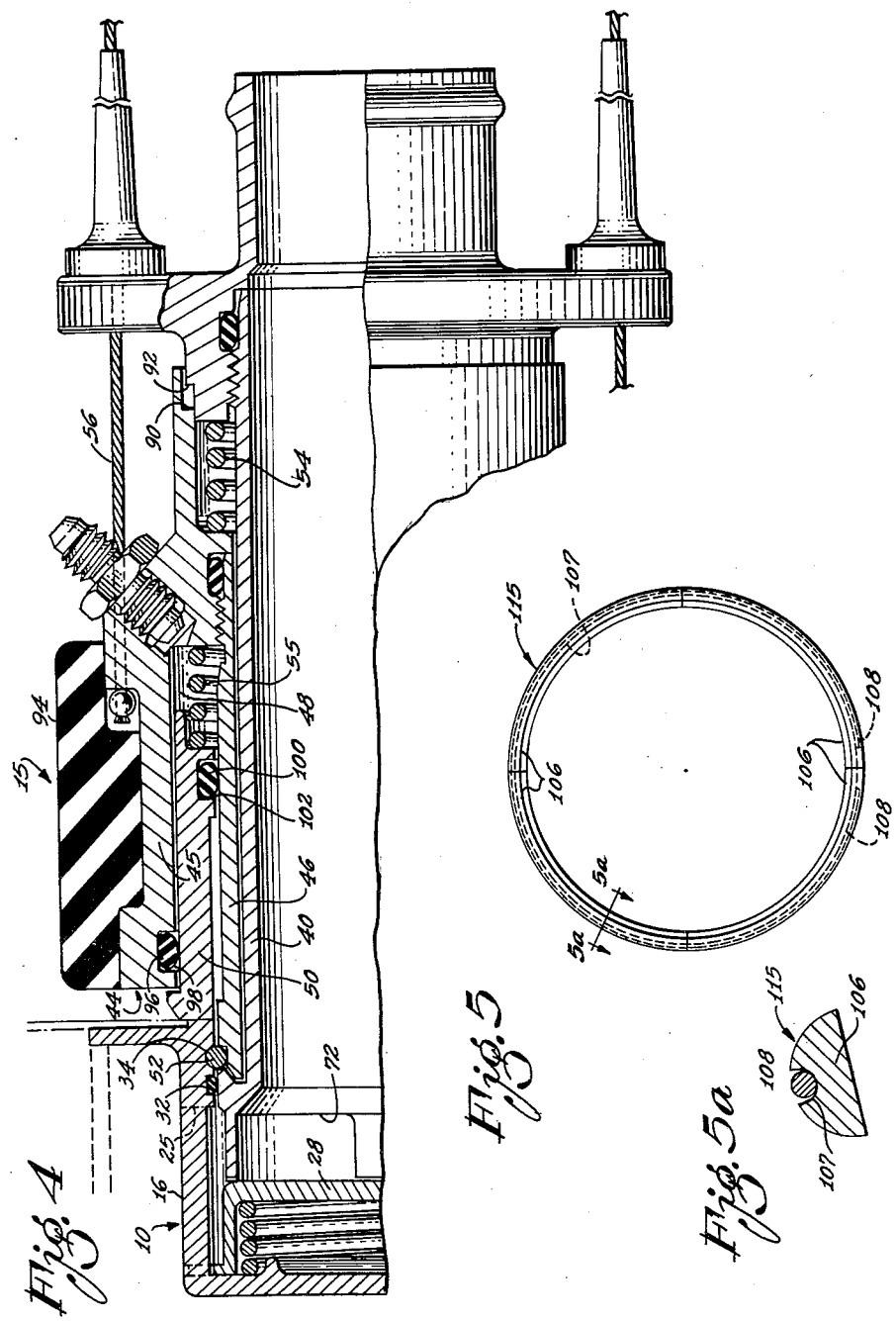

United States Patent Office 3,023,030
Patented Feb. 27, 1962

3,023,030
QUICK DISCONNECT COUPLING FOR
FLUID LINES
Jorge Torres, Los Angeles, Calif., assignor, by mesne assignments, to On Mark Couplings, Inc., Los Angeles, Calif., a corporation of California
Filed July 28, 1958, Ser. No. 751,408
9 Claims. (Cl. 285—18)

This invention relates to a quick disconnect coupling for interconnecting fluid lines in various types of installations. For the purpose of disclosure, an embodiment of the invention is described herein that releasably connects a flexible hose to a fluid passage port of an aerial vehicle such as an airplane or self-propelled missile. Such a disclosure will provide adequate guidance for those skilled in the art who may have occasion to apply the same principles to other specific purposes.

The type of coupling to which the invention pertains comprises two coupling bodies to form end portions of two fluid passages respectively that are to be interconnected, and the operation of connecting the two coupling bodies together consists simply of manually forcing the two coupling bodies axially together, the leading end of one coupling body telescoping into the leading end of the other with self-locking action. In the present embodiment of the invention, the female coupling body is incorporated in the aerial vehicle and is termed a socket or socket fitting. The cooperating coupling body is mounted on the end of the flexible hose and is termed an adapter or adapter fitting.

A coupling of the present type further includes radially expansible and contractible engagement means on one of the coupling bodies for releasable engagement with a circumferential shoulder of the other coupling body. In the present embodiment of the invention, the locking shoulder is an inner circumferential shoulder of the socket body. The radially expansible and contractible engagement means is mounted on the adapter body for expansion into engagement with this circumferential locking shoulder, and the locking sleeve is movably mounted on the adapter body to telescope into the engagement means to lock the engagement in its expanded state. In this regard, a feature of one practice of the invention is the use of such an engagement means that comprises a circumferential series of ring segments interconnected by relatively fine resilient wire means.

In the present application of the invention, it is desirable that the fluid passage port on the aerial vehicle provided by the socket fitting be automatically closed in a fluid-tight manner, whenever the adapter is not engaged with the socket. It is further desirable that the port be closed flush with the skin of the aerial vehicle. To meet these requirements, the socket is provided with a poppet valve that is normally held in a closed position flush with the vehicle skin and is yieldable to be retracted to open position by abutment against the adapter fitting when the adapter fitting is telescoped into the socket fitting.

The invention achieves simplification in construction and operation by using a single sealing means on the socket fitting. Normally, this sealing means cooperates with the poppet valve of the socket fitting to close the vehicle port when the coupling is not in use. When the adapter fitting is telescoped into the socket fitting, the same sealing means cooperates with the adapter body to seal the coupling joint.

In preparing for take-off of an aerial vehicle, such as a self-propelled missile, it may be essential that the uncoupling operation be carried out by remote control from a blockhouse. To meet this requirement, the invention further includes means to retract the locking sleeve by remotely controlled fluid pressure and further provides a fluid-pressure-actuated ejector on the adapter to thrust against the socket fitting for retraction of the adapter fitting from the socket fitting. For this purpose, the adapter construction provides an annular fluid chamber with the ejector sleeve forming a forward wall of the chamber and the locking sleeve forming a rearward wall of the chamber. A remote control valve is opened to deliver compressed air to this chamber to cause rapid and complete disconnection of the flexible hose from the aerial vehicle.

The various features and advantages of the invention may be understood from the detailed description together with the accompanying drawings.

In the drawings, which are to be regarded as merely illustrative:

FIG. 1 is a view, partly in side elevation and partly in longitudinal section, showing the two coupling bodies positioned in preparation for moving the adapter body axially into interlocking engagement with the socket body;

FIG. 2 is an enlarged sectional portion of FIG. 1 showing the radially expansible and contractible engagement means and working parts associated therewith;

FIG. 3 is a view similar to FIG. 2 showing the position of the radially expansible and contractible means at an intermediate stage in the advancement of the adapter into interlocking engagement with the socket;

FIG. 4 is a fragmentary view, partly in longitudinal section and partly in side elevation, showing the two coupling bodies interlocked for fluid flow therethrough;

FIG. 5 is a side elevation of an alternate form of radially expansible and contractible engagement means that may be employed in the practice of the invention; and FIG. 5a is an enlarged cross section taken as indicated by the line 5a—5a in FIG. 5.

FIG. 1 shows a socket fitting, generally designated 10, for mounting at the external end of a fluid passage of an aerial vehicle, the fluid passage being formed by a cylindrical wall 12 indicated by dotted lines, the skin of the vehicle being indicated at 14. FIG. 1 also shows an adapter fitting 15 for use on the end of a flexible hose, the adapter fitting being shown poised close to the socket fitting in position for axial movement into interlocking engagement with the socket fitting.

The socket fitting 10 has a cup-shaped body 16 with a rear end wall 18 and a forward radial flange 20 which flange abuts the rear surface of the skin 14 with the socket body flush with the skin. As may be seen in FIG. 1, the cup-shaped socket body 16 is smaller in diameter than the cylindrical wall 12 of the fluid passage in which it is mounted, there being an annular space 22 surrounding the cup-shaped body inside the fluid passage. The cylindrical wall of the cup-shaped socket body 16 is cut away to provide large radial openings 25 which are in communication with the annular space 22 and thus provide for flow communication with the fluid passage formed by the cylindrical wall 12.

The cup-shaped socket body 16 is formed with an inner circumferential rearwardly facing shoulder 26 to serve as a stop for a flanged cup-shaped poppet valve member 28 and, as best shown in FIG. 3, the socket body is also formed with an inner circumferential groove 30 to seat a sealing ring 32 for cooperation with the poppet valve member 28. As also best shown in FIG. 3, the socket body 16 further has an inner circumferential groove 34 which forms a rearwardly facing inner circumferential shoulder 35 for locking engagement by the adapter fitting 15. The poppet valve member 28 is normally held in its forward closed position by a coil spring 36, the poppet valve member being substantially flush with the skin 14.

The principal parts of the adapter fitting 15 include: a tubular body 40 having a rearwardly extending nipple portion 42 by means of which it may be mounted on the end of a flexible hose, this body being dimensioned to telescope into the socket body 16; a locking sleeve 44 having an outer circumferential wall 45 and an inner circumferential wall 46 forming an annular chamber 48; an ejector sleeve 50 that is slidingly mounted in the annular chamber 48 and extends forward therefrom for abutment against the rim of the socket body 16; a radially expansible and contractible engagement means in the form of a locking ring 52 which may be a simple split ring for engagement with the inner circumferential shoulder 35 of the socket body 16; a coil spring 54 urging the locking sleeve 44 towards a forward position at which the locking sleeve is effective to lock the split ring 52 in positive engagement with the inner circumferential shoulder 35; a second coil spring 55 mounted in compression in the annular chamber 48 to urge the ejector sleeve 50 forward; a lanyard 56 in the form of a U-shaped cable having its ends connected to the locking sleeve 44 for manual retraction thereof; and a threaded fitting 58 mounted in the locking sleeve 44 for connection to a hose 60 of small diameter for the introduction of compressed air or other compressed gaseous fluid, the hose being provided with a valve 62 remote from the adapter.

The body 40 of the adapter fitting 15 has an outer circumferential sealing portion 64 which makes sealing contact with the sealing ring 32 of the socket body 16 when the adapter is interlocked with the socket and has a leading portion 65 which is of reduced diameter to facilitate insertion of the adapter into the socket, there being a sloping circumferential shoulder 66 (FIG. 3) at the transition from the leading portion 65 to the sealing portion 64. The leading portion 65 of the adapter body 40 is cut away to provide a series of radial openings 72 which register with the previously mentioned radial openings 25 of the socket fitting when the adapter fitting is interlocked therewith. Rearward from the circumferential sealing portion 64, the adapter body 40 is reduced in diameter to provide a rearwardly facing circumferential locking shoulder 70 (FIGS. 1 and 3) for cooperation with the locking ring 52 in the interlocking engagement of the adapter fitting with the socket fitting.

The rearward portion of the adapter body 40 is a separate section 40a mounted by screw threads 74 with the joint sealed by a suitable sealing ring 75. This body section 40a is formed with a radial flange 76 which has apertures 78 through which the lanyard 56 extends. Each of the two ends of the lanyard 56 carries what may be termed a fulcrum body 80 which is normally spaced away from the corresponding flange 76, as shown in FIG. 1, and abuts the flange when the adapter fitting is interlocked with the socket fitting as shown in FIG. 4.

As best shown in FIGS. 2 and 3, the leading end of the inner circumferential wall 46 of the locking sleeve 44 is formed with a tapered surface 82 which is normally partially under or inside the locking ring 52 to hold the locking ring against the inner circumferential surface 84 of the ejector sleeve 50 as shown in FIG. 2. When the adapter fitting is inserted into the socket fitting, the locking ring 52 shifts from the inner circumferential surface 84 of the ejector sleeve 50 to the inner circumferential surface of the socket body 16 as indicated in FIG. 3. When the adapter is completely inserted in the socket, the tapered leading surface 82 of the locking sleeve 44 cams the locking ring 52 into the groove 34 of the socket 10 for interlocking engagement with the inner circumferential shoulder 35 of the socket, and then a circumferential surface 84 (FIG. 3) of the locking sleeve slides under or into the locking ring 52 to lock the ring in the groove in positive engagement with the inner circumferential shoulder 35 as shown in FIG. 4.

The locking sleeve 44 may be made in two sections united by screw threads 85 with the joint sealed by a sealing ring 86. The locking sleeve 44 has a rearwardly extending skirt 88 that encloses the locking sleeve spring 54 and is formed with a stop shoulder 90 (FIG. 1) for abutment against a stop shoulder 92 of the adapter body 40a. The outer circumferential wall 45 of the locking sleeve 44 may be embraced by a sleeve 94 of rubber-like material to serve as a convenient hand grip.

To make the annular chamber 48 substantially fluid-tight, suitable sealing rings are associated with the ejector sleeve 50. For this purpose, one sealing ring 96 is mounted in an inner circumferential groove 98 of the outer wall 45 of the locking sleeve 44, and a second sealing ring 100 is mounted in an inner circumferential groove 102 of the ejector sleeve. The ejector sleeve 50 may be formed with a rearwardly facing circumferential shoulder 104 to serve as a stop for abutment against the locking sleeve 44 to keep the ejector sleeve 50 from being inadvertently retracted into the chamber 48 to such extent as to uncover the sealing ring 96.

The manner in which the described coupling operates for its purpose may be readily understood from the foregoing description. When the adapter fitting 15 is partially telescoped into the socket fitting 10, the ejector sleeve 50 is partially retracted by abutment against the rim of the socket body 16, and the poppet valve member 28 of the socket fitting is retracted by the leading end of the adapter body 40. In the course of this movement, the locking ring 52 shifts from contact with the inner circumference of the ejector sleeve 50 to contact with the inner circumferential surface of the socket body 16, as shown in FIG. 3. The locking sleeve 44 is held in its normal retracted position at this time by the locking ring 52, the forward tapered surface 82 of the locking sleeve pressing against the locking ring and the locking ring, in turn, pressing against the rearwardly directed circumferential shoulder 70 of the adapter body 40.

When the adapter fitting is completely inserted into the socket fitting, the various parts are in the positions shown in FIG. 4. The locking ring 52 is locked in the groove 34 against the circumferential shoulder 35 by the locking sleeve 44, the ejector sleeve 50 being at its rearward retracted position. The outer circumferential sealing portion 64 of the adapter fitting body 40 is in sealing contact with the sealing ring 32 of the socket fitting 10. The ejector sleeve 50 is fully retracted against the opposition of the spring 55. The poppet valve member 28 is fully retracted by the leading end of the adapter body, and the radial openings 72 in the leading end of the adapter body 40 are positioned adjacent the radial openings 25 of the socket body 16 for fluid flow between the adapter fitting and the socket fitting.

To uncouple the adapter fitting from the socket fitting, the locking sleeve 44 is retracted, the operator either grasping the locking sleeve itself or grasping the lanyard 56 for the same purpose. If the lanyard 56 is pulled out of its normal alignment shown in FIGS. 1 and 4, the fulcrum bodies 80 rock against the face of the radial flange 76 to provide leverage that facilitates retraction of the locking sleeve. The retraction of the locking sleeve 44 frees the locking ring 52 to contract out of the groove 34, and the rearwardly directed shoulder 70 of the withdrawing adapter body forces the locking ring away from the groove. The withdrawal movement of the adapter is aided by the manner in which the spring 55 causes the ejector sleeve 50 to thrust against the rim of the socket fitting.

To cause the adapter 15 to withdraw from the socket 10 by remote control, the operator merely opens the normally closed remote valve 62 to permit the high pressure gaseous fluid to flow through the small hose 60 and the fitting 58 into the annular chamber 48. The fluid pressure provided in the annular chamber 48 in this manner exerts forward thrust on the ejector sleeve 50 and simultaneous rearward thrust on the locking sleeve 44. The rearward movement on the locking sleeve 44 frees the locking ring 52 to drop out of the groove 34, and the fluid-pressure-thrust of the ejector sleeve 50 against the rim of the socket results in prompt separation of the adapter from the socket.

FIGS. 5 and 5a show the construction of an alternate form of locking ring 115 that may be substituted for the simple split locking ring 52. The locking ring 115 comprises a circumferential series of ring segments 106 positioned end-to-end. Each of the ring segments has a circumferential groove 107 and a small diameter split ring 108 of spring wire slats in the aligned grooves 107 to embrace the series of ring segments in a sliding manner. Thus, the series of segments 106 is free to expand but is resiliently urged to contract by the spring wire 108.

My description in specific detail of the selected embodiment of the invention will suggest various changes, substitutions and other departures from my disclosure within the spirit and scope of the appended claims.

I claim:

1. In a coupling for releasably connecting a first fluid passage with a second fluid passage, including a first coupling body to form an end portion of said first fluid passage and having a rearwardly facing circumferential shoulder, a second coupling body to form an end portion of said second fluid passage, radially expansible and contractable engagement means carried by said second coupling body for engagement with said circumferential shoulder to hold the two coupling bodies together, a locking sleeve mounted on said second coupling body and axially movable relative thereto between a rearward retracted position and a forward position effective to lock said engagement means in engagement with said circumferential shoulder, and spring means to urge said locking sleeve forward, the improvement comprising: an ejector sleeve carried by said second coupling body to thrust forward against said first coupling body; a second spring means to urge said ejector sleeve forward; and an annular chamber formed in part by said locking sleeve and in part by said ejector sleeve to receive fluid under pressure for thrusting said locking sleeve rearward and thrusting said ejector sleeve forward.

2. A combination as set forth in claim 1, in which said locking sleeve forms the inner circumferential wall, the outer circumferential walls and the rear end wall of said annular chamber, said ejector sleeve forming the front end wall of the chamber.

3. A combination as set forth in claim 2, in which said second spring is mounted in said chamber in compression between the forward and rearward end walls thereof; and in which said first spring means is substantially stronger than said second spring means to overcome the resistance of the second spring means when the two coupling bodies are interconnected.

4. In a coupling for releasably connecting a first fluid passage with a second fluid passage, including a first coupling body to form an end portion of said first fluid passage and having an inner circumferential rearwardly facing shoulder, a second coupling body to form an end portion of said second fluid passage and to telescope into said first coupling body, radially expansible and contractable engagement means carried by said second coupling body for expansion into engagement with said inner circumferential shoulder to hold the two coupling bodies together, a locking sleeve telescoped over said second coupling body and movable axially thereof between a retracted position and a forward position inside said engagement means to lock the engagement means in engagement with said inner circumferential shoulder, and a spring means urging said locking sleeve towards its effective locking position, the improvement comprising: an ejector sleeve carried by said second coupling body for abutment against the leading end of said first coupling body to be retracted thereby when the second coupling body is telescoped into the first coupling body, said ejector sleeve having an inner circumferential surface to telescope over said engagement means to hold the engagement means in contracted state when the two coupling bodies are disconnected from each other; a second spring means urging said ejector sleeve forward; and an annular chamber formed in part by said ejector sleeve to receive fluid under pressure for cooperating with said spring means to urge the ejector sleeve forward.

5. A combination as set forth in claim 4, in which said locking sleeve has a tapered leading edge to expand said engagement means with a cam action.

6. A combination as set forth in claim 1 in which said annular chamber has an inlet passage for the admission of fluid under pressure to exert rearward thrust on the locking sleeve and forward thrust on the ejector sleeve; and which includes remotely controlled means to admit fluid under pressure into said annular chamber for disconnecting the two coupling bodies by remote control.

7. In a coupling for releasably connecting a first fluid passage with a second fluid passage, including a first coupling body to form an end portion of said first fluid passage and having a rearwardly facing circumferential shoulder, a second coupling body to form an end portion of said second fluid passage, radially expansible and contractable engagement means carried by said second coupling body for engagement with said circumferential shoulder to hold the two coupling bodies toegther, a locking sleeve mounted on said second coupling body and axially movable relative thereto between a rearward retracted position and a forward position effective to lock said engagement means in engagement with said circumferential shoulder, and spring means to urge said locking sleeve forward, the improvement comprising: said radially expansible and contractable engagement means comprising a circumferential series of locking ring segments carried by said second coupling body adjacent said outer circumferential shoulder and flexible means of substantially smaller cross-sectional dimension than said locking ring segments interconnecting the locking ring segments end to end.

8. A combination as set forth in claim 7, in which said flexible means interconnecting said locking ring segments is resilient and urges said locking ring segments radially inwardly.

9. Means for breaking a joint between two fluid passage means wherein connecting means releasably joins two coupling bodies that are mounted on the ends of the two fluid passage means respectively, said joint-breaking means comprising: a first fluid pressure actuated member on one of said coupling bodies to release said connecting means; a second fluid pressure actuated member on one of said bodlies to thrust against the other body for separation of the two bodies; a source of fluid under pressure; and remotely controlled means to release fluid from said source to act on said two fluid pressure actuated members for releasing said connecting means and for exerting separation force between the two coupling bodies.

References Cited in the file of this patent

UNITED STATES PATENTS

| | | |
|---|---|---|
| 2,449,938 | Hansen | Sept. 21, 1948 |
| 2,665,928 | Omon et al. | Jan. 12, 1954 |
| 2,727,761 | Elliott et al. | Dec. 20, 1955 |
| 2,797,110 | Covington | June 25, 1957 |
| 2,823,934 | Gorrell et al. | Feb. 18, 1958 |
| 2,828,978 | Wurzburger | Apr. 1, 1958 |
| 2,921,802 | Canner | Jan. 19, 1960 |